United States Patent Office 2,865,854
Patented Dec. 23, 1958

2,865,854

METHOD OF REDUCING B. O. D. OF STARCH BEARING EFFLUENT BY ADDITION OF SUBSTITUTED CELLULOSE TO EFFLUENT

Walter J. Sweet, Wilmington, Del., assignor to Hercules Powder Company, Wilmington, Del., a corporation of Delaware No Drawing. Application June 16, 1955
Serial No. 516,047

3 Claims. (Cl. 210—59)

This invention relates to a novel and unexpected improvement in processes employing starch wherein starch-containing effluents from the operations are discharged into streams, rivers or other bodies of water.

Starch is used extensively in the textile industry in sizing warp preparatory to weaving and in finishing cloth. Starch is also used in the papermaking field as a sizing material, and it has been used rather extensively as a laundry size. In various operations wherein starch is used, it is often necessary to discharge starch-containing effluents into rivers and stream or other bodies of water. Starch has a relatively high biochemical oxygen demand, and the discharging of the starch-containing effluents into the water courses or other bodies of water can result in the partial or even total depletion of the oxygen in the water. This is one of the recognized methods of causing severe damage to water courses or other bodies of water. Consequently, the biochemical oxygen demand now being introduced into streams of water from textile mills or other commercial operations is a serious industrial problem, and a convenient method of reducing the biochemical oxygen demand being introduced into the water courses from such commercial operations is highly desirable and in some instances essential.

In accordance with this invention, it has been found that in a process wherein starch is employed as a treating agent, such as in a textile mill, and wherein a starch-containing effluent from the process is discharged into a body of water, thus substantially increasing the biochemical oxygen demand of that body of water, the actual biochemical oxygen demand of the starch in said body of water can be appreciably and unexpectedly decreased by incorporating in said body of water a water-soluble cellulose ether.

The effect of the addition of a carboxyalkyl cellulose derivative to a body of water contaminated with starch is shown by the examples hereinbelow. In these examples, B. O. D. refers to the biochemical oxygen demand of the contaminated water which can be defined as the quantity of oxygen required for the biochemical oxidation of the decomposable matter in the water at a given temperature within a given time. The commonly accepted dilution method approved by A. P. H. A. (American Public Health Association) was used to determine B. O. D. All the runs in these examples were carried out in aqueous solutions approximating textile mill practice containing 0.1% or 1000 p. p. m. of either starch or sodium carboxymethylcellulose or mixtures thereof. The solutions were kept just below their boiling temperature for one hour and any excess free chlorine was neutralized. A standard amount of each solution was diluted with water in a standard bottle from which all air bubbles were excluded. The dilution water had a known oxygen content measured in p. p. m. It had been inoculated with bacteria and it contained needed nitrogen- and phosphorous-containing bacteria nutrients. The diluted samples were incubated at 20° C. for various periods of time, after which the unused oxygen was determined. The difference between the initial oxygen content and the unused oxygen was the B. O. D. of the sample in p. p. m. To approximate conditions encountered in commercial practice, a small amount of dilute settled domestic sewage was added to each dilution bottle, and the B. O. D. value of this sewage was deducted in the calculation of the B. O. D. of the various samples.

*Example 1*

Following the above procedure, the B. O. D. of a 0.1% aqueous starch solution was measured at various time intervals as follows:

| Days: | B. O. D. |
|---|---|
| 1 | 245 |
| 2 | 549 |
| 3 | 672 |
| 4 | 760 |
| 5 | 812 |
| 6 | 851 |
| 7 | 895 |
| 8 | 911 |
| 9 | 928 |
| 10 | 945 |

*Example 2*

Following the above procedure, the B. O. D. of 0.1% aqueous solutions of sodium carboxymethylcellulose (CMC) of various degrees of substitution was measured at various time intervals as follows:

| Days | B. O. D. | | |
|---|---|---|---|
| | CMC (0.7 D. S.) | CMC (0.9 D. S.) | CMC (1.2 D. S.) |
| 1 | 1.58 | 0.26 | 1.83 |
| 2 | 4.08 | 1.26 | 3.31 |
| 3 | 7.38 | 2.00 | 4.29 |
| 4 | 7.98 | 2.50 | 4.59 |
| 5 | 10.7 | 2.90 | 5.47 |
| 6 | 13.5 | 3.89 | 7.00 |
| 7 | 42.4 | 12.6 | 16.0 |
| 8 | 49.2 | 32.6 | 33.5 |
| 9 | 55.0 | 40.0 | 41.5 |
| 10 | 57.5 | 46.0 | 47.5 |

A comparison of the data in the above examples reveals that the B. O. D. of starch is considerably higher than the B. O. D. of sodium carboxymethylcellulose.

*Example 3*

Following the above procedure, the B. O. D. of a 0.1% aqueous solution of a 65/35 mixture of sodium carboxymethylcellulose (CMC), having a D. S. of 0.7, and starch was measured at various time intervals. Also, the expected or calculated B. O. D. of the same solution was determined on the basis of the amount of starch present and the B. O. D. of starch as observed in Example 1. By way of illustration, in Example 1 the B. O. D. of starch was measured as 245 p. p. m. after one day in a 0.1% solution. In a 65/35 CMC/starch mixture in a 0.1% solution, the B. O. D. of starch after one day was calculated to be 86 (245×0.35=86). The B. O. D. of the CMC was not considered in these calculations since it would be relatively low, but the addition of the B. O. D. of CMC to the B. O. D. of starch would make the difference between the observed and calculated B. O. D. more pronounced than the table below demonstrates.

| Days | B. O. D. | | Ratio of Observed B. O. D. to Calculated B. O. D. |
|---|---|---|---|
| | Observed | Calculated | |
| 1 | 19 | 86 | 0.23 |
| 2 | 172 | 193 | 0.89 |
| 3 | 221 | 235 | 0.94 |
| 4 | 256 | 266 | 0.96 |

Example 4

In a manner similar to Example 3 using a 0.1% aqueous solution of a 50/50 mixture of sodium carboxymethylcellulose (CMC), having a D. S. of 0.7, and starch, the following data were observed and calculated:

| Days | B. O. D. | | Ratio of Observed B. O. D. to Calculated B. O. D. |
|---|---|---|---|
| | Observed | Calculated | |
| 1 | 25 | 123 | 0.20 |
| 2 | 200 | 275 | 0.72 |
| 3 | 300 | 336 | 0.89 |
| 4 | 352 | 380 | 0.93 |
| 5 | 395 | 406 | 0.97 |

Example 5

In a manner similar to Example 3 using a 0.1% aqueous solution of a 35/65 mixture of sodium carboxymethylcellulose (CMC), having a D. S. of 0.7, and starch, the following data were observed and calculated:

| Days | B. O. D. | | Ratio of Observed B. O. D. to Calculated B. O. D. |
|---|---|---|---|
| | Observed | Calculated | |
| 1 | 31 | 159 | 0.20 |
| 2 | 341 | 357 | 0.95 |
| 3 | 396 | 438 | 0.91 |

Example 6

In a manner similar to Example 3 using a 0.1% aqueous solution of a 20/80 mixture of sodium carboxymethylcellulose (CMC), having a D. S. of 0.7, and starch, the following data were observed and calculated:

| Days | B. O. D. | | Ratio of Observed B. O. D. to Calculated B. O. D. |
|---|---|---|---|
| | Observed | Calculated | |
| 1 | 44 | 196 | 0.22 |
| 2 | 324 | 440 | 0.74 |
| 3 | 509 | 538 | 0.95 |
| 4 | 563 | 608 | 0.93 |
| 5 | 631 | 650 | 0.97 |

Example 7

In a manner similar to Example 3, the B. O. D. of 0.1% solutions of 65/35 mixtures of sodium carboxymethylcellulose (CMC) and starch was determined. Two types of CMC were used, one having a degree of substitution (D. S.) of 0.9 carboxymethyl group per anhydroglucose unit and the other having a D. S. of 1.2.

| Days | B. O. D. | | | Ratio Observed B. O. D. to Calculated B. O. D. | |
|---|---|---|---|---|---|
| | Observed | | Calculated | CMC (0.9 D. S.) | CMC (1.2 D. S.) |
| | CMC (0.9 D. S.) | CMC (1.2 D. S.) | | | |
| 1 | 15 | 28 | 86 | 0.17 | 0.32 |
| 2 | 194 | 179 | 193 | 1.00 | 0.94 |
| 3 | 233 | 220 | 235 | 0.99 | 0.94 |
| 4 | | 251 | 266 | | 0.94 |
| 5 | | 279 | 284 | | 0.98 |

Example 8

In a manner similar to Example 3, the B. O. D. of 0.1% aqueous solutions of 50/50 mixtures of CMC and starch was determined. The CMC had a D. S. of 0.9 and 1.2.

| Days | B. O. D. | | | Ratio Observed B. O. D. to Calculated B. O. D. | |
|---|---|---|---|---|---|
| | Observed | | Calculated | CMC (0.9 D. S.) | CMC (1.2 D. S.) |
| | CMC (0.9 D. S.) | CMC (1.2 D. S.) | | | |
| 1 | 25 | 18 | 123 | 0.20 | 0.14 |
| 2 | 197 | 201 | 275 | 0.72 | 0.73 |
| 3 | 260 | 330 | 336 | 0.78 | 0.98 |
| 4 | 340 | 384 | 380 | 0.89 | 1.01 |
| 5 | 370 | 399 | 406 | 0.91 | 0.98 |

Example 9

In a manner similar to Example 3, the B. O. D. of 0.1% aqueous solutions of 20/80 mixtures of CMC and starch was determined. The CMC had a D. S. of 0.9 and 1.2.

| Days | B. O. D. | | | Ratio Observed B. O. D. to Calculated B. O. D. | |
|---|---|---|---|---|---|
| | Observed | | Calculated | CMC (0.9 D. S.) | CMC (1.2 D. S.) |
| | CMC (0.9 D. S.) | CMC (1.2 D. S.) | | | |
| 1 | 34 | 54 | 196 | 0.17 | 0.28 |
| 2 | 309 | 339 | 440 | 0.70 | 0.77 |
| 3 | 536 | 481 | 538 | 1.00 | 0.89 |
| 4 | 592 | 534 | 603 | 0.97 | 0.88 |
| 5 | 672 | 589 | 650 | 1.03 | 0.91 |

The cellulose derivatives that are employed in the practice of this invention are of the water-soluble type. Among the water-soluble cellulose ethers that can be used are the alkyl celluloses, for example, methyl cellulose, ethyl cellulose, propyl cellulose, and the like, and the carboxyalkyl cellulose ethers, such as carboxymethylcellulose, carboxyethyl cellulose, carboxypropyl cellulose, and the like, hydroxyalkyl cellulose ethers, such as hydroxyethyl cellulose, mixed cellulose ethers, such as carboxymethyl hydroxyethyl cellulose, and sulfoalkyl cellulose ethers, such as sulfoethyl cellulose. In the preferred form of the invention, carboxymethylcellulose is employed in the form of an alkali metal salt such as sodium carboxymethylcellulose. The invention will be discussed hereinafter in greater detail with reference to the use of sodium carboxymethylcellulose.

The sodium carboxymethylcellulose that is employed has a degree of substitution defined as the number of sodium carboxymethyl groups per anhydroglucose unit such that the cellulose derivative is water-soluble. Usually, a degree of substitution of at least 0.3 is required for substantial water solubility. In most instances, the sodium carboxymethylcellulose that is employed will have a degree of substitution within the range of about 0.65 to about 1.40 with a preferred range being from 0.7–1.2. The viscosity of the sodium carboxymethylcellulose as measured at 25° C. will be within the range of about 18 cps. to about 2,500 cps. and higher as measured in a 2% aqueous solution.

The sodium carboxymethylcellulose can be prepared by any of the usual and presently known procedures. For example, cellulose in the form of cotton linters or wood pulp can be reacted with caustic alkali to form an alkali cellulose, and the resulting product is then reacted with monochloracetic acid either in a dough process or in a slurry process to form the desired sodium carboxymethylcellulose.

The amount of sodium carboxymethylcellulose that is employed in the practice of this invention will vary within relatively wide limits. In the specific examples, ratios of carboxymethylcellulose to starch within the range of 20:80 to 65:35 have been shown to produce the desired results. However, proportions outside of this range can be used. The amount of sodium carboxymethylcellulose that is actually used will depend upon the conditions existing in the body of water into which the starch-containing effluent is being discharged and to some extent upon the amount of biochemical oxygen demand reduction desired. In a warp size mixture of starch and sodium carboxymethylcellulose within the scope of this invention, the mixture usually contains at least 5% by weight of sodium carboxymethylcellulose. The practical and preferred range for the amount of sodium carboxymethylcellulose in such a mixture is from about 20% to about 50% by weight. If desired, the sodium carboxymethylcellulose can be used in amounts up to 90% by weight and higher of such mixtures.

Usually, it will be found desirable to mix the sodium carboxymethylcellulose with the starch size prior to its use in the commercial operation, particularly in warp sizing procedures. The sodium carboxymethylcellulose, as well as the starch, is an effective sizing agent, and, consequently, it can be employed to replace a substantial portion of the starch size. In fact, it is preferred to employ the sodium carboxymethylcellulose in this manner. However, in some operations it may be desired to employ only the starch in the commercial operation, and in that event the sodium carboxymethylcellulose will be added to the starch-containing effluent from the process. Alternatively, the sodium carboxymethylcellulose may be added directly to the body of water that has been or is being contaminated by the starch containing effluent.

In the preferred form of this invention, a sizing composition containing both starch and sodium carboxymethylcellulose is employed as a sizing medium, and the effluent from the process containing both starch and sodium carboxymethylcellulose is discharged into a stream of water. In addition to the starch and sodium carboxymethylcellulose, the sizing composition may contain other ingredients such as lubricants, for example, microcrystalline wax, beeswax, carbowax, and the like, and defoaming agents such as sulfonated oils, calcium chloride, and the like. However, the sodium carboxymethylcellulose is the important component of such sizing compositions for substantially reducing the biochemical oxygen demand of any stream or other body of water that is being contaminated by the effluent from such a process.

It is apparent from the data in the above examples that the sodium carboxymethylcellulose effectively reduces the biochemical oxygen demand of the body of water contaminated with the starch-containing effluent for only several days. Thus, this invention can be most desirably practiced in an operation where the starch-containing effluent is discharged into a relatively small stream which in a short time empties into a larger stream or tidal water. In that manner, the effectiveness of the sodium carboxymethylcellulose in reducing the biochemical oxygen demand of the starch is realized in the relatively small contaminated stream and after the relatively small stream empties into the comparatively larger body of water the reduction in biochemical oxygen demand is no longer important and necessary.

What I claim and desire to protect by Letters Patent is:

1. In a process wherein starch is employed as a treating agent and wherein an effluent from said process containing starch is discharged into a body of water thereby increasing the biochemical oxygen demand of said body of water, the improvement which comprises incorporating in said body of water a water-soluble cellulose ether in an amount sufficient to give an ether/starch ratio of 20/80–65/35, said ether containing substituent groups selected from the class consisting of carboxyalkyl and hydroxyalkyl substituent groups in an amount of at least 0.3 substituent group per anhydroglucose unit.

2. In a process wherein starch is employed as a treating agent and wherein an effluent from said process containing starch is discharged into a body of water thereby increasing the biochemical oxygen demand of said body of water, the improvement which comprises incorporating in said body of water a water-soluble carboxyalkyl cellulose ether in an amount sufficient to give a carboxyalkyl cellulose ether/starch ratio of 20/80–65/35, said ether containing at least 0.3 carboxyalkyl group per anhydroglucose unit.

3. In a process wherein starch is employed as a warp sizing agent and wherein an effluent from said process containing starch is discharged into a body of water thereby increasing the biochemical oxygen demand of said body of water, the improvement which comprises incorporating in said body of water a water-soluble sodium carboxymethylcellulose in an amount sufficient to give a sodium carboxymethylcellulose/starch ratio of 20/80–65/35, said sodium carboxymethylcellulose containing at least 0.7–1.2 sodium carboxymethyl groups per anhydroglucose unit.

References Cited in the file of this patent

UNITED STATES PATENTS 2,663,989   Schlatter et al. _____ Dec. 29, 1953

OTHER REFERENCES

Dupont (Brochure A–830) "Sodium CMC," copyright 1950.